(12) United States Patent
Kokayeff et al.

(10) Patent No.: US 9,353,319 B2
(45) Date of Patent: May 31, 2016

(54) METHODS FOR PRODUCING DIESEL RANGE MATERIALS HAVING IMPROVED COLD FLOW PROPERTIES

(71) Applicant: UOP LLC, Des Plaines, IL (US)

(72) Inventors: Peter Kokayeff, Naperville, IL (US); Suheil F. Abdo, Lincolnshire, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/327,865

(22) Filed: Jul. 10, 2014

(65) Prior Publication Data

US 2014/0319024 A1 Oct. 30, 2014

Related U.S. Application Data

(63) Continuation-in-part of application No. 12/903,874, filed on Oct. 13, 2010, now abandoned.

(51) Int. Cl.
| | |
|---|---|
| *C10G 45/58* | (2006.01) |
| *C10G 45/60* | (2006.01) |
| *C10L 1/02* | (2006.01) |
| *C10L 1/08* | (2006.01) |
| *C10G 3/00* | (2006.01) |
| *C10G 65/04* | (2006.01) |

(52) U.S. Cl.
CPC *C10G 45/58* (2013.01); *C10G 3/42* (2013.01); *C10G 3/50* (2013.01); *C10G 45/60* (2013.01); *C10G 65/043* (2013.01); *C10L 1/026* (2013.01); *C10L 1/08* (2013.01); *C10G 2300/1014* (2013.01); *C10G 2300/1018* (2013.01); *C10G 2300/1022* (2013.01); *C10G 2300/1055* (2013.01); *C10G 2300/202* (2013.01); *C10G 2300/304* (2013.01); *C10G 2300/70* (2013.01); *C10G 2400/04* (2013.01); *Y02P 30/20* (2015.11)

(58) Field of Classification Search
None
See application file for complete search history.

(56) References Cited

U.S. PATENT DOCUMENTS

| | | | |
|---|---|---|---|
| 7,077,947 B2 * | 7/2006 | Cody et al. | 208/89 |
| 2008/0066374 A1 * | 3/2008 | Herskowitz | 44/308 |

* cited by examiner

*Primary Examiner* — Tam M Nguyen
(74) *Attorney, Agent, or Firm* — James C. Paschall

(57) ABSTRACT

Embodiments of a method for producing a diesel range material having improved cold flow properties are provided. In one embodiment, the method includes the steps of providing a waxy diesel range feedstock, producing an intermediary product stream containing a predetermined amount of oxygenated organocompounds from the waxy diesel range feedstock, and contacting the intermediary product stream with a dewaxing catalyst under process conditions at which the oxygenated organocompounds chemically interact with the dewaxing catalyst to convert a portion of the n-paraffins within the intermediary product stream to iso-paraffins while minimizing cracking of the diesel range material.

20 Claims, 2 Drawing Sheets

METHODS FOR PRODUCING DIESEL RANGE MATERIALS HAVING IMPROVED COLD FLOW PROPERTIES

CROSS-REFERENCE TO RELATED APPLICATION

This application is a Continuation-In-Part of application Ser. No. 12/903,874 filed Oct. 13, 2010, now abandoned, the contents of which are hereby incorporated by reference in its entirety.

FIELD OF THE INVENTION

The present invention relates generally to fuel production and, more particularly, to embodiments of a method for producing diesel range materials having improved cold flow properties.

DESCRIPTION OF RELATED ART

Diesel range materials produced from vegetable oil hydrotreating or Fischer Tropsch ("F-T") synthesis provide excellent cetane ratings. However, such materials also typically contain undesirably high quantities of long chain ($C_{18}$-$C_{24}$) n-paraffins and, consequently, suffer from poor cold flow properties; e.g., undesirably high cloud points (i.e., temperatures at which some long straight chain paraffins begin to precipitate from the fluid and create a cloudy appearance) and undesirably high pour points (i.e., minimum temperatures at which the fluid will readily flow or can be pumped under prescribed operating conditions). In order to improve cold flow properties, diesel range materials produced from vegetable oil hydrotreating and F-T liquids are often subjected to catalytic dewaxing processes wherein n-paraffins are isomerized or converted into shorter, branched iso-paraffins. Ideally, the catalytic dewaxing process converts a relatively large proportion of n-paraffins to iso-paraffins with minimal cracking of the diesel range materials to lighter products, such as naphtha range products.

In addition to the long chain n-paraffins described above, diesel range materials produced from vegetable oil hydrotreating and F-T synthesis also typically contain oxygen compounds. The presence of oxygen compounds has traditionally been regarded as highly undesirable due to the negative impact of such oxygen compounds on catalyst activity and a potentially disruptive effect on fuel stability. For this reason, oxygen compounds have conventionally been removed, in their entirety, along with various other contaminants (e.g., sulfur and nitrogen) prior to contact with the dewaxing catalyst. Oxygen compounds are conventionally removed utilizing a hydrotreating process wherein bonds are broken at the oxygen linkages to allow conversion of the oxygen to water and carbon dioxide. To ensure the complete removal of oxygen compounds, as well as the effective removal of the other contaminants, the hydrotreating process is typically performed under relatively harsh operating conditions, which may include temperatures approaching or exceeding approximately 700° F. (approximately 371° C.) and pressures as high as 1,000 pounds per square inch gauge (6,895 kPa).

Catalytic dewaxing processes, and particularly the catalysts employed in such dewaxing processes, have been and continue to be the subject of extensive engineering efforts to continually bring about improvements in catalyst selectivity; i.e., to increase the degree of isomerization relative to hydrocarbon cracking during the dewaxing process. An ongoing demand still exists, however, for further improvements in catalyst selectivity. In this regard, it is desirable to provide embodiments of a method for producing diesel range materials, such as those derived from biorenewable sources or produced utilizing F-T synthesis, which yields diesel range materials having improved cold flow properties. Other desirable features and characteristics of embodiments of the present invention will become apparent from the subsequent Detailed Description and the appended Claims, taken in conjunction with the accompanying Drawings and the foregoing Description of Related Art.

SUMMARY OF THE INVENTION

Embodiments of a method for producing a diesel range material having improved cold flow properties are provided. In one embodiment, the method includes the steps of providing a waxy diesel range feedstock; hydrotreating the waxy diesel range feedstock at a temperature of less than 315° C. to produce an intermediary product stream, containing a predetermined amount of oxygenated organocompounds ranging from about 200 to about 2000 parts per million by weight oxygen in a liquid portion of the intermediary product stream, from the waxy diesel range feedstock; and contacting the intermediary product stream with a dewaxing catalyst under process conditions at which the oxygenated organocompounds chemically interact with the dewaxing catalyst to convert a portion of the n-paraffins within the intermediary product stream to iso-paraffins while minimizing cracking of the diesel range material.

In a further embodiment, the method includes the steps of converting carbon monoxide and hydrogen into a waxy diesel range feedstock utilizing Fischer-Tropsch synthesis; removing a portion of the oxygenated organocompounds by hydrotreating at less than 315° C. to yield an intermediary product stream containing a predetermined amount of retained oxygenated organocompounds ranging from about 200 to about 2000 parts per million by weight oxygen in a liquid portion of the intermediary product stream; and hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio.

In a still further embodiment, the method includes the steps of deriving a diesel range feedstock containing n-paraffins and oxygenated organocompounds from a biorenewable source; removing a portion of the oxygenated organocompounds by hydrotreating at a temperature of less than 315° C. to yield an intermediary product stream containing a predetermined amount of retained oxygenated organocompounds ranging from about 200 to about 2000 parts per million by weight oxygen in a liquid portion of the intermediary product stream; and hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Description of Related Art or the following Detailed Description.

Figure 1:
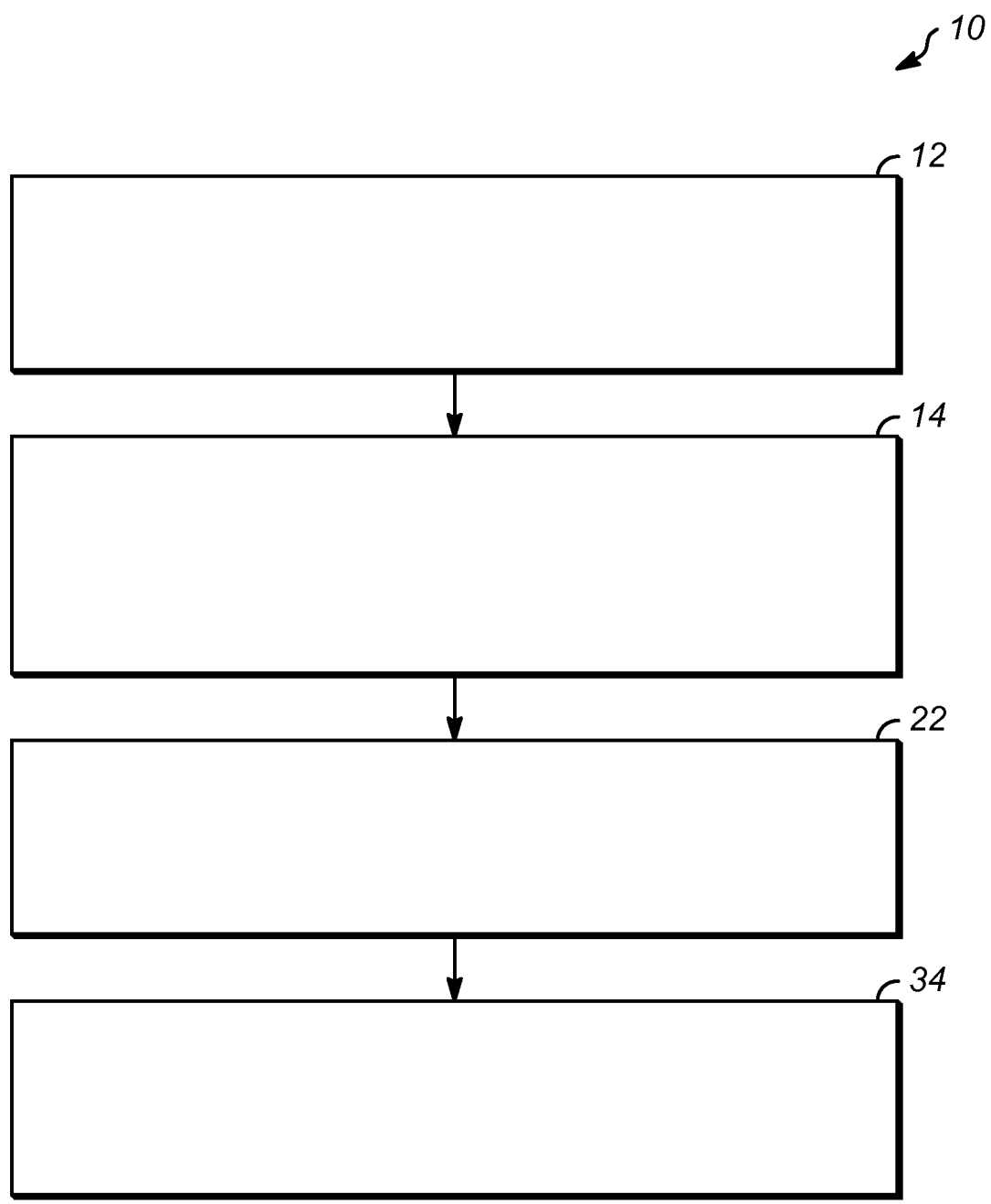
FIG. 1 is a flowchart illustrating an exemplary embodiment of a method for producing diesel range materials having improved cold flow properties.
Figure 2:
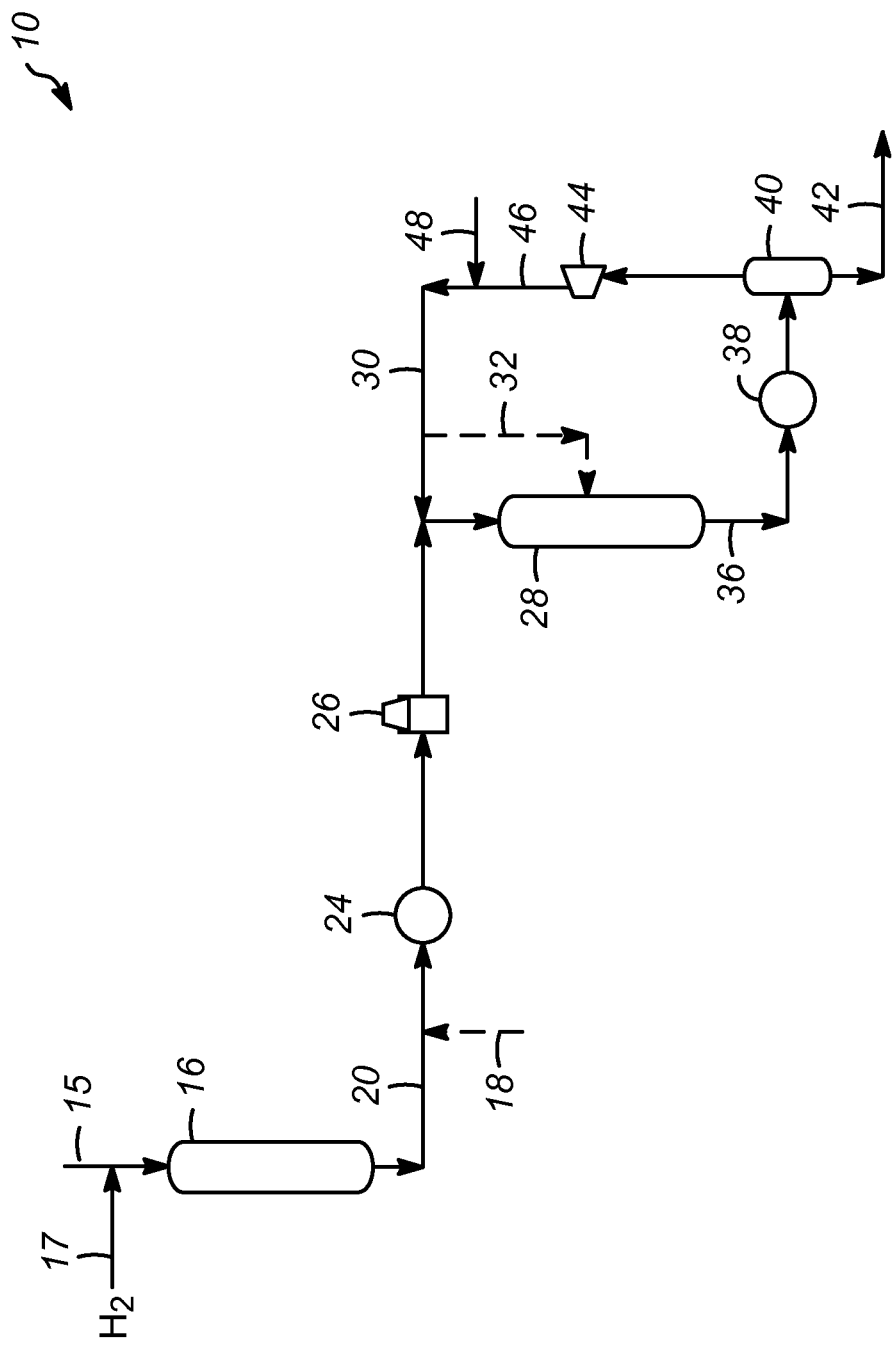
FIG. 2 is a simplified process flow diagram illustrating one manner in which the exemplary method shown in FIG. 1 may be carried-out.

FIG. 1 is a flowchart of an exemplary method 10 for yielding diesel range fuels having improved cold flow properties. FIG. 2 is a simplified process flow diagram illustrating one manner in which exemplary method 10 may be implemented. For purposes of explanation, exemplary method 10 will be described hereafter in conjunction with the exemplary process flow diagram shown in FIG. 2. It should be understood, however, that various other process flow schemes can be utilized to carry-out embodiments of method 10. It should also be understood that the flow process diagram shown in FIG. 2 is provided as a simplified example only and that other types and arrangements of petroleum refining equipment may be utilized to process the waxy diesel range feedstock in accordance with exemplary method 10. In this regard, certain conventionally-known components are omitted from the flow process diagram shown in FIG. 2 and will not be described below in the interest of brevity. Such conventionally-known components omitted from FIG. 2 may include, but are not limited to, one or more vapor/liquid separators, recycle gas compressors, and like components conventionally combined with one or more hydrotreatment reactors (e.g., reactor 16 described below) to produce a hydrotreatment complex.

Exemplary method 10 commences with the step of providing a waxy diesel range feedstock (STEP 12, FIG. 1). As utilized herein, the term "diesel range feedstock" denotes a hydrocarbon-based fuel feedstock suitable for use within a diesel engine, containing $C_{10}$-$C_{24}$ hydrocarbons, and having a boiling range from about 300° to about 720° F. (about 149° to about 382° C.). Similarly, the term "waxy diesel range feedstock" denotes a diesel range feedstock, as previously defined, containing at least 30 wt % normal paraffins. The n-paraffins contained within the waxy diesel range feedstock will typically have $C_{10}$-$C_{22}$ carbon chains, which may be mono-, di-, or poly-unsaturated. Although the waxy diesel range feedstock may be derived from a petroleum-based source in certain embodiments, it is generally preferred that the waxy diesel range feedstock comprises either: (i) an oil or grease derived from a bio-renewable source and rich in triglycerides and free fatty acids, or (ii) a hydrocarbon-based liquid produced from carbon monoxide and hydrogen utilizing Fischer-Tropsch synthesis (referred to herein as a "Fischer-Tropsch liquid" or, more simply, as an "F-T liquid"). In the former case, the waxy diesel range feedstock may be derived from animal-based products, plant-based products, and algal oils. Examples of suitable animal-based products include fish oil and refined animal fats, such as tallow and lard. Examples of suitable plant-based products include various types of vegetable oils, such as camelina oil, canola oil, corn oil, jatropha oil, palm oil, rapeseed oil, salicornia oil, soy oil, tall oil, and used cooking oils. When produced from a renewable feedstock utilizing biomass-to-liquid, gas-to-liquid, vegetable oil refining, or an analogous technology and subjected to fractional distillation (as opposed to transesterification), the diesel range material is commonly referred to as "green diesel" and is especially useful as a diesel blending component. In certain embodiments, exemplary method 10 may be utilized in conjunction with or incorporated into the Ecofining® process developed and commercially implemented by UOP, LCC (formerly "Universal Oil Products"), headquartered in Des Plaines, Ill.

Advancing to STEP 14 of exemplary method 10 (FIG. 1), the waxy diesel range feedstock is next processed to produced to an intermediary product stream containing a predetermined amount of oxygenated organocompounds. Processing of the waxy diesel range feedstock will typically include at least one hydrotreatment step during which the feedstock is contacted with a hydrodeoxygenation catalyst at predetermined hydrogenation conditions to hydrogenate the olefinic or unsaturated portions of the n-paraffinic chains present in the feedstock and to remove oxygen, if present, and other impurities (e.g., sulfur and nitrogen) from the feedstock. EQ. 1 below describes the hydrodeoxygenation reaction by which free fatty acids present in the feedstock may be converted to hydrocarbons and water in the presence of hydrogen gas and a selected hydrodeoxygenation catalyst, such as a metallic composition embedded with an inorganic oxide or zeolite substrate.

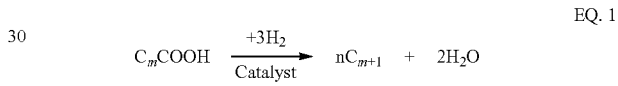

EQ. 1

As indicated above, decarboxylation reactions also occur during hydrotreatment of the waxy diesel range material (STEP 14, FIG. 1). During decarboxylation, free fatty acids within the waxy diesel range feedstock are converted to normal (i.e., straight chain) hydrocarbons and carbon dioxide. The carbon dioxide reacts, in turn, with hydrogen to produce carbon monoxide and water. These reactions are expressed by EQs. 2 and 3 below.

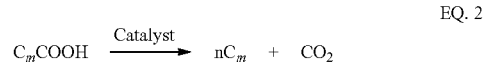

EQ. 2

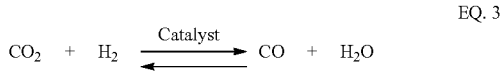

EQ. 3

Hydrotreatment is typically carried-out in one or more treatment reactors (e.g., one or more vertically-oriented vessels), such as hydrotreatment reactor 16 shown in FIG. 2 (introduction of the waxy diesel range feedstock into reactor 16 indicated in FIG. 2 by arrow 15). Prior to introduction into hydrotreatment reactor 16 (FIG. 2), the waxy diesel range feedstock may be passed through one or more filters (not shown) to remove particulate matter and one or more heating devices (also not shown) to preheat the feedstock and promote the above-described reactions. In many embodiments, the hydrogen gas may also be premixed with the waxy diesel range feedstock prior to introduction into the hydrotreatment reactor; e.g., as indicated in FIG. 2 at 17, hydrogen gas may be mixed with the waxy diesel range feedstock immediately upstream of hydrotreatment reactor 16, and the hydrogen gas and the feedstock may then be introduced into hydrotreatment reactor 16 as a combined overhead stream.

In preferred embodiments wherein the waxy diesel range feedstock is derived from a biorenewable source or comprises an F-T liquid, the waxy diesel range feedstock will typically contain oxygen atoms bound in the form of oxygenated organocompounds. Such oxygenated organocompounds may include organic acids (e.g., carboxylic acid), alcohols, and possibly nascent organo-oxygen compounds formed during processing. As explained in the foregoing section entitled "DESCRIPTION OF RELATED ART," hydrotreatment of such waxy diesel range materials has traditionally been carried-out under relatively harsh process conditions to ensure that all oxygen or oxygenated organocompounds are removed by conversion to water, carbon dioxide, or other byproduct. The harsh process conditions employed during hydrotreatment commonly include temperatures approaching or exceeding approximately 700° F. (approximately 371° C.) and pressures as high as 1,000 pounds per square inch gauge ("psig") or 6,895 kilopascal (kPa).

In embodiments wherein the waxy diesel range feedstock contains oxygenated organocompounds, and in contrast to conventional hydrotreatment processes of the type described above, hydrotreatment is performed under milder process conditions where only a portion of the oxygenated organocompounds is removed from the feedstock via conversion to byproducts (e.g., water and carbon dioxide) while predetermined amount of oxygenated organocompounds is retained within the feedstock and, specifically, within the liquid portion of the hydrotreatment reaction product. In a preferred embodiment, hydrotreatment is performed under process conditions at which the conversion of the oxygenated organocompounds is controlled to retain about 200 to about 2000 parts per million oxygen by weight in the process material and specifically about 400 to about 6000 parts per million by weight and preferably 600 to about 4000 parts per million by weight carboxylic acids. Notably, as complete or 100% conversion of oxygen is no longer required, hydrotreatment can be carried-out under process conditions that are considerably more mild than the harsh process conditions traditionally employed during hydrotreatment. For example, hydrotreatment may be carried-out at operating temperatures of less than 600° F. (315° C.), suitably less than about 595° F. (313° C.), more suitably less than 590° C. (310° C.) and preferably less than 572° F. (300° C.) and maximum operating pressures of about 600 psig (4137 kilopascal) and in some cases no more than 300 psig (2068 kilopascal). In a preferred embodiment, the oxygenated compounds retained within the process material are those having acidic properties believed to promote paraffin isomerization (e.g., organic acids, such as carboxylic acid), as described more fully below. The liquid hourly space velocity may be between 0.2 and 10, preferably between about 0.5 and 6 $hr^{-1}$, and the hydrogen rate may bet between about 2000 scf/bbl (337 $Nm^3/m^3$ oil) and about 10000 scf/bbl (1685 $Nm^3/m^3$ oil).

In addition to the liquid-phase intermediary product stream, the hydrotreatment reaction product includes a gaseous portion composed primarily of unreacted hydrogen, carbon dioxide, propane, and other light hydrocarbons generated during the hydrotreatment process. The gaseous portion is conventionally treated to remove carbon dioxide and produce a hydrogen recycle gas, which may be returned to the hydrotreatment zone or reactor (e.g., reactor 16 shown in FIG. 1) for repeated usage. By comparison, the liquid portion of the reaction product (i.e., the intermediary product stream) comprises the desired hydrocarbon fraction and an undesirably high quantity of n-paraffins, which are subsequently converted to iso-paraffins utilizing a hydroisomerization process of the type described below.

In certain embodiments of method 10, oxygenated organocompounds may optionally be added to the intermediary product stream during STEP 14 of exemplary method 10 (FIG. 1). For example, as indicated in FIG. 2 by dashed line 18, oxygenated organocompounds may be introduced into an intermediary product stream 20, which exits hydrotreatment reactor 16 through a lower outlet. Introduction of oxygenated organocompounds into the intermediary product stream is especially advantageous in embodiments wherein the waxy diesel range feedstock is derived from a petroleum-based source. In such embodiments, it is generally preferred that the oxygenated organocompounds added into the product stream primarily comprise or at least include oxygenated organocompounds having acidic properties, such as carboxylic acid and other organic acids.

To isomerize the n-paraffins intermediary product stream and thereby improve the cold flow properties of the final diesel range product, the intermediary product stream is next subjected to a catalytic dewaxing or hydroisomerization process at STEP 22 of exemplary method 10 (FIG. 1). During the hydroisomerization process, the intermediary product stream is contacted with a dewaxing catalyst under a prescribed set of process conditions to convert some portion of the long chain n-paraffins to shorter, branched iso-paraffins. This process is generally described by EQ. 4 below wherein "$nC_m$" and "$iC_m$" represent n-paraffins and iso-paraffins having carbon chains containing "m" carbon atoms, respectively.

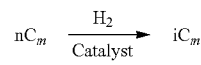

$$nC_m \xrightarrow[\text{Catalyst}]{H_2} iC_m \qquad \text{EQ. 4}$$

Hydroisomerization may be carried-out in one or more fixed-bed reactors. For example, as indicated in FIG. 2, after leaving hydrotreatment reactor 16, the intermediary product stream 20 may be directed through and heated by a feed/effluent ("F/E") heat exchanger 24 (FIG. 2), subsequently directed through and further heated by a fired heater 26 (FIG. 2), and then introduced into a hydroisomerization reactor 28 as an overhead stream. As indicated in FIG. 2 at 30, the intermediary product stream may also be mixed with recycled hydrogen gas prior to introduction into hydroisomerization reactor 28. If desired, a quench stream 32 may also be siphoned from the recycled hydrogen gas line and introduced into an intermediate section of hydroisomerization reactor 28 in the conventionally-known manner. Although not shown in FIG. 2 for clarity, the intermediary product stream 20 provided by hydrotreatment reactor 16 may also be directed through a liquid/vapor separator prior to being introduced into reactor 28 to remove hydrogen sulfide and other undesired materials.

As is well-known in the petroleum-refining industry, the hydroisomerization process is accompanied by cracking of the diesel range materials into less desirable lighter products, such as naphtha range products. For example, after performance of a traditional hydroisomerization process, a distillate feed boiling in a range of approximately 300° to 700° F. (approximately 149° to 371° C.) may yield approximately 2 to 20 wt % of $C_5$, 300° F. (149° C.) naphtha. The yield of less desired products varies in relation to the severity of the process conditions; as process condition severity is increased (e.g., as process temperatures and pressures are increased) to promote paraffin isomerization, the yield of less desirable, lighter products increases correspondingly. Advancements in isomerization catalysts have been able to reduce the yield of less desired products within certain limits; however, a need still exists to further reduce hydrocarbon cracking at a given degree of isomerization through improvements in catalyst selectivity.

In accordance with the teachings of embodiments of the present invention, it is proposed that, when a predetermined amount of oxygenated organocompounds is supplied to a hydroisomerization zone or reactor in conjunction with the intermediary product stream, the oxygenated organocompounds chemically interact with the dewaxing catalyst to increase catalyst selectivity and thereby promote conversion of the n-paraffins to iso-paraffins while simultaneously minimizing undesired cracking of the diesel range product. Consequently, a diesel range material may be produced having an improved iso-normal paraffin ratio (i.e., an improved proportion of branched iso-paraffins relative to straight chained normal paraffins) and, therefore, superior cold flow properties. Without being bound by theory, it is generally believed that the presence of oxygenated organocompounds, and specifically those compounds having weak acidic properties, promote paraffin isomerization by an acid-catalyzed mechanism; e.g., proton-donation to functional groups present in the n-paraffins promoting transformation of the paraffin structure to branched isomer forms. Considering this, it is generally preferred that the oxygenated organocompounds contained within the intermediary product stream are those having acidic properties promoting isomerization, such as organic acids generally and carboxylic acid specifically. While the presence of such oxygenated organocompounds may decrease catalyst activity to a certain extent, the negative impact of any decrease in catalyst activity is outweighed by the benefits of improved catalyst selectivity. Notably, most, if not all, of the oxygenated compounds are converted to byproducts (e.g., water and carbon dioxide) during the hydroisomerization process and, consequently, will not be present within the finished diesel range product.

The process parameters employed during hydroisomerization will inevitably vary amongst different embodiments of exemplary method 10 (FIG. 1). However, by way of non-limiting example, hydroisomerization may be carried-out in a fixed bed reactor (e.g., reactor 28 shown in FIG. 2) having Liquid Hourly Space Velocities ("LHSV") of about 0.1-10 $hr^{-1}$ and, preferably, of about 1-3 $hr^{-1}$; under pressures of about 200 to 1500 psig (about 1379-10,342 kPa) and, preferably, of about 500 to 800 psig (about 3447-5516 kPa); at hydrogen addition rates of about 500 to 10,000 Standard Cubic Feet per Barrel ("SCF/B") or about 84.26 to 1685 Normal Cubic Meters per Cubic Meter ("NCM/CM") and, preferably, about 2500 to 5000 SCF/B or about 421.3 to 842.6 NCM/CM; and at temperatures of about 400° to 750° F. (about 204° to 399° C.) and, preferably, of about 550° to 600° F. (about 288° to 316° C.). Any suitable catalyst may be employed during hydroisomerization. As a non-limiting example, the hydroisomerization catalyst may contain approximately 20 to 80 wt % low acidity zeolite to provide the requisite acidic function and approximately 0.1 to 0.5 wt % noble metal, such as platinum. As previously indicated, it is preferred that substantially all (i.e., at least 99 wt %) of the oxygenated organocompounds are converted to byproducts, and thus effectively removed from the product stream, during the hydroisomerization process. In an aspect, a preferred support for the hydroisomerization catalyst is amorphous silica-alumina.

After performance of the above-described hydroisomerization process (STEP 22, FIG. 1), the product stream is subjected to series of conventionally-known process steps to complete processing and yield the desired diesel range fuel product and, perhaps, one or more additional products (STEP 34, FIG. 1). For example, with reference to FIG. 2, a product stream 36 recovered from hydroisomerization reactor 28 may be directed through an F/E heat exchanger 38 and into an intermediate section of a vapor/liquid separator 40. It is noted that, while represented by separate symbols in FIG. 2 for clarity, F/E heat exchanger 38 and F/E heat exchanger 24 will typically comprise a single heat exchanger unit or component in actual implementations of the processing system. The vapor/liquid separator 40 then separates the product stream into the desired liquid product (i.e., diesel range fuel), as indicated in FIG. 2 at 42; and hydrogen gas, which may then be directed through a compressor 44 and ultimately recycled back to the overhead inlet of hydroisomerization reactor 28, as indicated in FIG. 2 at 46. Fresh make-up hydrogen may also be added to the recycled gas stream proximate, for example, either the intake or the discharge of compressor 44, as shown in FIG. 2 at 48. Although not shown in FIG. 2, the liquid product drawn from vapor/liquid separator 40 may be subjected to further processing (e.g., distillation) to produce additional products, such as propane, naphtha, and aviation or jet fuel, in the conventionally-known manner. In this manner, exemplary method 10 yields final diesel range material having an improved iso-normal paraffin ratio and, consequently, superior cold flow properties (e.g., a higher cloud point and pour point) as compared to conventionally-produced diesel range materials of the type described above.

The foregoing has thus provided embodiments of method for producing a diesel range material having improved cold flow properties. More specifically, the above-described methods improved catalyst selectivity during hydroisomerization by: (i) providing a waxy diesel range feedstock; (ii) hydrotreating the waxy diesel range feedstock to produce an intermediary product stream containing a predetermined amount of oxygenated organocompounds; and (iii) contacting the intermediary product stream with a dewaxing catalyst under process conditions at which the oxygenated organocompounds chemically interact with the dewaxing catalyst to convert a portion of the n-paraffins within the intermediary product stream to iso-paraffins while minimizing cracking of the diesel range material. The last of the foregoing steps can also be described as contacting the intermediary product stream with a dewaxing catalyst under process conditions at which the oxygenated organocompounds chemically interact with the dewaxing catalyst to increase catalyst selectivity and thereby provide a diesel range material having an improved iso-normal paraffin ratio and improved cold flow properties. Embodiments of the above-described method are especially useful in the processing of diesel range materials produced from bio-renewable sources and Fischer-Tropsch liquids containing native oxygenated organocompounds.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

Specific Embodiments

While the following is described in conjunction with specific embodiments, it will be understood that this description is intended to illustrate and not limit the scope of the preceding description and the appended claims.

A first embodiment of the invention is a method for producing a diesel range material having improved cold flow properties, the method comprising the steps of providing a waxy diesel range feedstock; hydrotreating the waxy diesel range feedstock at a temperature of less than 315° C. to produce an intermediary product stream, containing a predetermined amount of oxygenated organocompounds ranging from about 200 to about 2000 parts per million by weight oxygen in a liquid portion of the intermediary product stream, from the waxy diesel range feedstock; and contacting the intermediary product stream with a dewaxing catalyst under process conditions at which the oxygenated organocompounds chemically interact with the dewaxing catalyst to convert a portion of the n-paraffins within the intermediary product stream to iso-paraffins while minimizing cracking of the diesel range material. An embodiment of the invention is one, any or all of prior embodiments in this paragraph up through the first embodiment in this paragraph wherein the step of providing a waxy diesel range feedstock comprises supplying a waxy diesel range feedstock containing n-paraffins and oxygenated organocompounds, and wherein the step of hydrotreating the waxy diesel range feedstock comprises removing a portion of the oxygenated organocompounds from the waxy diesel range feedstock while retaining a predetermined amount of oxygenated organocompounds therein. An embodiment of the invention is one, any or all of prior embodiments in this paragraph up through the first embodiment in this paragraph wherein the intermediary product stream comprises at least 400 wppm carboxylic acids. An embodiment of the invention is one, any or all of prior embodiments in this paragraph up through the first embodiment in this paragraph wherein the step of supplying a waxy diesel range feedstock comprises deriving the waxy diesel range feedstock from a biorenewable source. An embodiment of the invention is one, any or all of prior embodiments in this paragraph up through the first embodiment in this paragraph wherein the step of deriving the waxy diesel range feedstock from a biorenewable source comprises deriving the waxy diesel range feedstock from a vegetable oil. An embodiment of the invention is one, any or all of prior embodiments in this paragraph up through the first embodiment in this paragraph wherein the step of deriving the waxy diesel range feedstock from a biorenewable source comprises deriving the waxy diesel range feedstock from algae. An embodiment of the invention is one, any or all of prior embodiments in this paragraph up through the first embodiment in this paragraph wherein the step of deriving the waxy diesel range feedstock from a biorenewable source comprises deriving the waxy diesel range feedstock from an animal-based source. An embodiment of the invention is one, any or all of prior embodiments in this paragraph up through the first embodiment in this paragraph wherein the step of supplying a waxy diesel range feedstock comprises producing the waxy diesel range feedstock from carbon monoxide and hydrogen utilizing Fischer-Tropsch synthesis. An embodiment of the invention is one, any or all of prior embodiments in this paragraph up through the first embodiment in this paragraph wherein step of contacting the intermediary product stream with a dewaxing catalyst comprises hydroisomerizing the intermediary product stream at temperatures between about 400° F. (about 204° C.) and about 750° F. (about 399° C.). An embodiment of the invention is one, any or all of prior embodiments in this paragraph up through the first embodiment in this paragraph wherein step of contacting the intermediary product stream with a dewaxing catalyst comprises hydroisomerizing the intermediary product stream at temperatures between about 550° F. (about 288° C.) and about 600° F. (about 316° C.). An embodiment of the invention is one, any or all of prior embodiments in this paragraph up through the first embodiment in this paragraph wherein step of contacting the intermediary product stream with a dewaxing catalyst comprises hydroisomerizing the intermediary product stream under pressures between about 200 pounds per square inch gauge (about 1379 kilopascal) and about 1500 pounds per square inch gauge (about 10,342 kilopascal). An embodiment of the invention is one, any or all of prior embodiments in this paragraph up through the first embodiment in this paragraph wherein step of contacting the intermediary product stream with a dewaxing catalyst comprises hydroisomerizing the intermediary product stream under pressures between about 500 pounds per square inch gauge (about 3447 kilopascal) and about 800 pounds per square inch gauge (5516 kilopascal). An embodiment of the invention is one, any or all of prior embodiments in this paragraph up through the first embodiment in this paragraph wherein step of contacting the intermediary product stream with a dewaxing catalyst comprises hydroisomerizing the intermediary product stream while adding hydrogen at a rate of about 500 to about 10,000 Standard Cubic Feet per Barrel (about 84.26 to about 1685 Normal Cubic Meters per Cubic Meter). An embodiment of the invention is one, any or all of prior embodiments in this paragraph up through the first embodiment in this paragraph wherein step of contacting the intermediary product stream with a dewaxing catalyst comprises hydroisomerizing the intermediary product stream while adding hydrogen at a rate of about 2,500 to about 5,000 Standard Cubic Feet per Barrel (about 421.3 to about 842.6 Normal Cubic Meters per Cubic Meter). An embodiment of the invention is one, any or all of prior embodiments in this paragraph up through the first embodiment in this paragraph wherein the oxygenated organocompounds comprise at least one of the group consisting of organic acids and alcohols. An embodiment of the invention is one, any or all of prior embodiments in this paragraph up through the first embodiment in this paragraph wherein the oxygenated organocompounds comprise carboxylic acid. An embodiment of the invention is one, any or all of prior embodiments in this paragraph up through the first embodiment in this paragraph wherein the step of providing a waxy diesel range feedstock comprises deriving the waxy diesel range feedstock from a petroleum-based source, and wherein the step of hydrotreating the waxy diesel range feedstock further comprises adding a predetermined quantity of oxygenated organocompounds to the waxy diesel range feedstock after hydrotreating.

A second embodiment of the invention is a method for producing a diesel range material having improved cold flow properties, the method comprising the steps of deriving a diesel range feedstock containing n-paraffins and oxygenated organocompounds from a biorenewable source; removing a portion of the oxygenated organocompounds by hydrotreating at a temperature of less than 315° C. to yield an intermediary product stream containing a predetermined amount of retained oxygenated organocompounds ranging from about 200 to about 2000 parts per million by weight oxygen in a liquid portion of the intermediary product stream; and hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio. An embodiment of the invention is one, any or all of prior embodiments in this paragraph up through the second embodiment in this paragraph wherein the step of hydroisomerizing the intermediary product stream comprises contacting the intermediary product stream with the dewaxing catalyst at temperatures between about 550° F. (about 288° C.) and about 600° F. (about 316° C.), under pressures between about 500 pounds per square inch gauge (about 3447 kilopascal) and about 800 pounds per square inch gauge (5516 kilopascal), and at hydrogen addition rates of about 2,500 to about 5,000 Standard Cubic Feet per Barrel (about 421.3 to about 842.6 Normal Cubic Meters per Cubic Meter).

A third embodiment of the invention is a method for producing a diesel range material having improved cold flow properties, the method comprising the steps of converting carbon monoxide and hydrogen into a waxy diesel range feedstock utilizing Fischer-Tropsch synthesis; removing a portion of the oxygenated organocompounds by hydrotreating at less than 315° C. to yield an intermediary product stream containing a predetermined amount of retained oxygenated organocompounds ranging from about 200 to about 2000 parts per million by weight oxygen in a liquid portion of the intermediary product stream; and hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for producing a diesel range material having improved cold flow properties, the method comprising the steps of:
   providing a waxy diesel range feedstock;
   hydrotreating the waxy diesel range feedstock at a temperature of less than 300° C. to produce an intermediary product stream, containing a predetermined amount of oxygenated organocompounds ranging from about 200 to about 2000 parts per million by weight oxygen in a liquid portion of the intermediary product stream, from the waxy diesel range feedstock; and
   contacting the intermediary product stream with a dewaxing catalyst under process conditions at which the oxygenated organocompounds chemically interact with the dewaxing catalyst to convert a portion of the n-paraffins within the intermediary product stream to iso-paraffins while minimizing cracking of the diesel range material.

2. The method according to claim 1 wherein the step of providing a waxy diesel range feedstock comprises supplying a waxy diesel range feedstock containing n-paraffins and oxygenated organocompounds, and wherein the step of hydrotreating the waxy diesel range feedstock comprises removing a portion of the oxygenated organocompounds from the waxy diesel range feedstock while retaining a predetermined amount of oxygenated organocompounds therein.

3. The method according to claim 1 wherein the intermediary product stream comprises at least 400 wppm carboxylic acids.

4. The method according to claim 2 wherein the step of supplying a waxy diesel range feedstock comprises deriving the waxy diesel range feedstock from a biorenewable source.

5. The method according to claim 4 wherein the step of deriving the waxy diesel range feedstock from a biorenewable source comprises deriving the waxy diesel range feedstock from a vegetable oil.

6. The method according to claim 4 wherein the step of deriving the waxy diesel range feedstock from a biorenewable source comprises deriving the waxy diesel range feedstock from algae.

7. The method according to claim 4 wherein the step of deriving the waxy diesel range feedstock from a biorenewable source comprises deriving the waxy diesel range feedstock from an animal-based source.

8. The method according to claim 2 wherein the step of supplying a waxy diesel range feedstock comprises producing the waxy diesel range feedstock from carbon monoxide and hydrogen utilizing Fischer-Tropsch synthesis.

9. The method according to claim 2 wherein step of contacting the intermediary product stream with a dewaxing catalyst comprises hydroisomerizing the intermediary product stream at temperatures between about 400° F. (about 204° C.) and about 750° F. (about 399° C.).

10. The method according to claim 2 wherein step of contacting the intermediary product stream with a dewaxing catalyst comprises hydroisomerizing the intermediary product stream at temperatures between about 550° F. (about 288° C.) and about 600° F. (about 316° C.).

11. The method according to claim 2 wherein step of contacting the intermediary product stream with a dewaxing catalyst comprises hydroisomerizing the intermediary product stream under pressures between about 200 pounds per square inch gauge (about 1379 kilopascal) and about 1500 pounds per square inch gauge (about 10,342 kilopascal).

12. The method according to claim 2 wherein step of contacting the intermediary product stream with a dewaxing catalyst comprises hydroisomerizing the intermediary product stream under pressures between about 500 pounds per square inch gauge (about 3447 kilopascal) and about 800 pounds per square inch gauge (5516 kilopascal).

13. The method according to claim 2 wherein step of contacting the intermediary product stream with a dewaxing catalyst comprises hydroisomerizing the intermediary product stream while adding hydrogen at a rate of about 500 to about 10,000 Standard Cubic Feet per Barrel (about 84.26 to about 1685 Normal Cubic Meters per Cubic Meter).

14. The method according to claim 2 wherein step of contacting the intermediary product stream with a dewaxing catalyst comprises hydroisomerizing the intermediary product stream while adding hydrogen at a rate of about 2,500 to about 5,000 Standard Cubic Feet per Barrel (about 421.3 to about 842.6 Normal Cubic Meters per Cubic Meter).

15. The method according to claim 1 wherein the oxygenated organocompounds comprise at least one of the group consisting of organic acids and alcohols.

16. The method according to claim 15 wherein the oxygenated organocompounds comprise carboxylic acid.

17. The method according to claim 1 wherein the step of providing a waxy diesel range feedstock comprises deriving the waxy diesel range feedstock from a petroleum-based source, and wherein the step of hydrotreating the waxy diesel range feedstock further comprises: adding a predetermined quantity of oxygenated organocompounds to the waxy diesel range feedstock after hydrotreating.

18. A method for producing a diesel range material having improved cold flow properties, the method comprising the steps of:
deriving a diesel range feedstock containing n-paraffins and oxygenated organocompounds from a biorenewable source;
removing a portion of the oxygenated organocompounds by hydrotreating at a temperature of less than 300° C. to yield an intermediary product stream containing a predetermined amount of retained oxygenated organocompounds ranging from about 200 to about 2000 parts per million by weight oxygen in a liquid portion of the intermediary product stream; and
hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio.

19. The method according to claim 18 wherein the step of hydroisomerizing the intermediary product stream comprises contacting the intermediary product stream with the dewaxing catalyst at temperatures between about 550° F. (about 288° C.) and about 600° F. (about 316° C.), under pressures between about 500 pounds per square inch gauge (about 3447 kilopascal) and about 800 pounds per square inch gauge (5516 kilopascal), and at hydrogen addition rates of about 2,500 to about 5,000 Standard Cubic Feet per Barrel (about 421.3 to about 842.6 Normal Cubic Meters per Cubic Meter).

20. A method for producing a diesel range material having improved cold flow properties, the method comprising the steps of:
converting carbon monoxide and hydrogen into a waxy diesel range feedstock utilizing Fischer-Tropsch synthesis;
removing a portion of the oxygenated organocompounds by hydrotreating at less than 300° C. to yield an intermediary product stream containing a predetermined amount of retained oxygenated organocompounds ranging from about 200 to about 2000 parts per million by weight oxygen in a liquid portion of the intermediary product stream; and
hydroisomerizing the intermediary product stream with a dewaxing catalyst under process conditions at which the oxygenated organocompounds chemically interact with the dewaxing catalyst to increase catalyst selectivity and provide a diesel range material having an improved iso-normal paraffin ratio.

* * * * *